(12) United States Patent
Tanaka et al.

(10) Patent No.: US 7,337,048 B2
(45) Date of Patent: Feb. 26, 2008

(54) VEHICULAR OCCUPANT PROTECTION SYSTEM

(75) Inventors: Tatsuki Tanaka, Nagoya (JP); Hidehiko Kumazawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 11/019,255

(22) Filed: Dec. 23, 2004

(65) Prior Publication Data

US 2005/0167960 A1    Aug. 4, 2005

(30) Foreign Application Priority Data

Jan. 29, 2004   (JP)   ............... 2004-021992
Jan. 29, 2004   (JP)   ............... 2004-021999

(51) Int. Cl.
 B60R 22/00   (2006.01)
(52) U.S. Cl. ............... 701/45; 701/31; 701/29; 340/438; 280/728.1
(58) Field of Classification Search ............ 701/45, 701/29, 31; 280/735, 728.1; 340/438
See application file for complete search history.

(56) References Cited

U.S. PATENT DOCUMENTS

| | | | | |
|---|---|---|---|---|
| 4,873,452 A | * | 10/1989 | Morota et al. | ............. 307/10.1 |
| 5,428,340 A | * | 6/1995 | Kawabata et al. | ........... 340/438 |
| 6,462,649 B1 | * | 10/2002 | Kimura | ....................... 340/435 |
| 6,988,026 B2 | * | 1/2006 | Breed et al. | .................. 701/29 |
| 2004/0084882 A1 | | 5/2004 | Okamoto et al. | |
| 2004/0103811 A1 | | 6/2004 | Okamoto et al. | |
| 2004/0104562 A1 | | 6/2004 | Okamoto et al. | |

FOREIGN PATENT DOCUMENTS

JP   A-2001-91536   4/2001
JP   A-2001-322527   11/2001

OTHER PUBLICATIONS

M. Bischoff, G. Fendt and D. Zechmair, "Different Approaches for Air Bag Triggering Units Using a Firing Bus," Tech. Report 971049, Soc. Automotive Engineers, Inc., Warrendale, Penn., 1997.*
L. Hatton, Safer C: Developing Software for High-Integrity and Safety-Critical Systems, McGraw-Hill, London, 1995.*
D.Y.W. Park et al., "Checking Properties of Safety-Critical Specifications Using Efficient Decision Procedures," Proc. Second Workshop on Formal Methods in Software Practice, M. Ardis, ed., ACM Press, New York, Mar. 1998, pp. 34-43.*

(Continued)

Primary Examiner—Cuong Nguyen
(74) Attorney, Agent, or Firm—Posz Law Group, PLC

(57) ABSTRACT

A vehicular occupant protection system includes an air bag sensor; a base signal generating unit that generates a base signal for abnormality diagnosis for the air bag sensor; a diagnosis-signal generating unit that generates a diagnosis signal for the air bag sensor base on the base signal; an abnormality diagnosing unit that executes the abnormality diagnosis by using output signal that the air bag sensor outputs based on the diagnosis signal; and a condition-signal generating unit that generates a condition for a start of generating of the diagnosis signal. Here, the diagnosis-signal generating unit generates the diagnosis signal based on the base signal when the condition signal satisfies a given condition.

14 Claims, 4 Drawing Sheets

OTHER PUBLICATIONS

J. Rushby, "Formal Methods and the Certification of Critical Systems," Tech. Report SRI-CSL-93-7, Computer Science Laboratory, SRI International, Menlo Park, Calif., Dec. 1993.*

R.R. Lutz, Analyzing Software Requirements Errors in Safety-Critical, Embedded Systems, Proc. IEEE Int'l Symp. Requirements Engineering, IEEE, Piscataway, N.J., Jan. 1993, pp. 126-133.*

R. von Hanxleden et al., "Hardware/Software Codesign of a Fault-Tolerant Communication Protocol," Digest of Abstracts IEEE Int'l Workshop Embedded Fault-Tolerant Systems, IEEE, Sep. 1996. Also available on ftp://ic.eecs.berkeley.edu/pub/HWSW/IEEE.EFTS96.ps.gz.*

N.G. Leveson et al., "Requirements Specification for Process-Control Systems," IEEE Trans. Software Engineering, vol. 20, No. 9, Sep. 1994, pp. 684-707.*

A codesign approach for safety-critical automotive applications, von Hanxleden, R.; Botorabi, A.; Kupczyk, S.; Micro, IEEE vol. 18, Issue 5, Sep.-Oct. 1998 pp. 66-79, Digital Object Identifier 10.1109/40.735945.*

First a broken jaw, now a beautiful partnership, Sandell, P.; Spectrum, IEEE, vol. 40, Issue 2, Feb. 2003 pp. 11-11 Digital Object Identifier 10.1109/MSPEC.2003.1176508.*

MEMS and nano/bio technologies, Fujita, H.; Nanotechnology, 2005. 5th IEEE Conference on, Jul. 11-15, 2005 pp. 195-198 vol. 1, Digital Object Identifier 10.1109/NANO.2005.1500727.*

IEEE Std 1616-2004 IEEE Standard for Motor Vehicle Event Data Recorders (MVEDRs), 2005 pp.0_1-163.*

First Office Action from Chinese Patent Office issued on Jan. 12, 2007 for the corresponding Chinese patent application No. 200510006167.X (a copy and English Translation thereof).

First Office Action from Chinese Patent Office issued on Jul. 13, 2007 for the corresponding Chinese patent application No. 200510006167.X (a copy and English translation thereof).

* cited by examiner

VEHICULAR OCCUPANT PROTECTION SYSTEM

CROSS REFERENCE TO RELATED APPLICATIONS

This application is based on and incorporates herein by reference Japanese Patent Applications No. 2004-21999 filed on Jan. 29, 2004 and No. 2004-21992 filed on Jan. 29, 2004.

FIELD OF THE INVENTION

The present invention relates to a vehicular occupant protection system that is capable of restricting mis-operation in its abnormality diagnosis for an air bag sensor.

BACKGROUND OF THE INVENTION

Patent document 1 describes an abnormality diagnosis such as a primary check in an air bag sensor of a vehicular occupant protection system. Here, pulse signals (diagnosis signals, abnormality-diagnosis signals) with given intervals are inputted to the air bag sensor, so that an abnormality diagnosis is executed based on output signals from the air bag sensor. However, when an input terminal for the abnormality-diagnosis signals experiences electrical noises, the air bag sensor sometimes involves mis-operation. That is, an abnormality diagnosis for the air bag sensor cannot be sometimes accurately performed.

On the other hand, a vehicular occupant protection system includes multiple sensor sub-systems (or sensor units) including air bag sensors such as satellite acceleration sensors in various portions in a vehicle. Further, the vehicular occupant protection system includes in a center portion in the vehicle a main control unit that determines abnormality in the sensor sub-systems while controlling ignition of squibs. Here, in a conventional vehicular occupant protection system, the main control unit and each of the sensor sub-systems are directly connected with each other.

However, as the number of sensor sub-systems is recently increased, the connection between the main control unit and each of the sensor sub-systems comes to be achieved by using a single bus (refer to Patent documents 2, 3). For instance, the number of interfaces of the main control unit can be thereby decreased to thereby reduce a size; and further, the number of sensor sub-systems can be easily changed in designing.

In the above conventional vehicular occupant protection system connected using the bus, when abnormality diagnosis such as a primary check is executed, the following processes take place. Here, each of the sensor sub-systems includes an air bag sensor and an abnormality diagnosing unit. In the primary check, the main control unit outputs an abnormality-diagnosis start command to an abnormality diagnosing unit of a first sensor sub-system because of an ignition switch turning on. The abnormality diagnosing unit of the first sensor sub-system then starts an abnormality diagnosis for the corresponding air bag sensor to then generate an abnormality-diagnosis result. The abnormality diagnosing unit of the first sensor sub-system then outputs the abnormality-diagnosis result to the main control unit. The main control unit subsequently outputs an abnormality-diagnosis start command to an abnormality diagnosing unit of a second sensor sub-system. Likewise, the abnormality diagnosing unit of the second sensor sub-system then starts an abnormality diagnosis for the corresponding air bag sensor to then generate an abnormality-diagnosis result. The abnormality diagnosing unit of the second sensor sub-system then outputs the abnormality-diagnosis result to the main control unit. This process is repeated to all sub-systems, thereafter terminating the abnormality diagnosis in the system.

Thus, in the abnormality diagnosis such as the primary check in the vehicular occupant protection system, after the abnormality diagnosis of the first sensor sub-system is terminated, the abnormality diagnosis of the second sensor sub-system is started. That is, as the number of sub-systems increases in the conventional vehicular occupant protection system, a time period required for the primary check increases.

Patent document 1: JP 2001-91536 A

Patent document 2: JP 2003-285716 A (U.S. 2004/0104562 A1, U.S. 2004/0103811 A1, U.S. 2004/0084882 A1)

Patent document 3: JP 2001-322527 A

SUMMARY OF THE INVENTION

It is an object of the present invention to provide a vehicular occupant protection system that is capable of restricting mis-operation in its abnormality diagnosis. Further, it is an additional object of the present invention to provide a vehicular occupant protection system, with its sensor sub-systems connected by a bus line, capable of decreasing a time period for abnormality diagnoses in all the sub-systems.

To achieve the above object, a vehicular occupant protection system is provided with the following. An air bag sensor is included. A base-signal generating unit is included for generating a base signal for abnormality diagnosis for the air bag sensor. A diagnosis-signal generating unit is included for generating a diagnosis signal for the air bag sensor base on the base signal. An abnormality diagnosing unit is included for executing the abnormality diagnosis by using output signal that the air bag sensor outputs based on the diagnosis signal. A condition-signal generating unit is further included for generating a condition signal for a start of generating the diagnosis signal. Here, the diagnosis-signal generating unit generates the diagnosis signal based on the base signal when the condition signal satisfies a given condition.

In this structure, when a condition signal satisfies a given condition, a diagnosis signal is generated and outputted to an air bag sensor. Therefore, even when noises disturb an input terminal for a base signal, mis-operation of the air bag sensor can be prevented. In detail, even when noises disturb the input terminal for the base signal, a diagnosis for the air bag sensor does not start in a case where the condition signal does not satisfy a given condition.

As an additional aspect of the above vehicular occupant protection system, the above vehicular occupant protection system further includes a main control unit and a bus line that connects the main control unit and a plurality of sub-systems. Each of the sub-systems includes the air bag sensor, the base-signal generating unit, the diagnosis-signal generating unit, the abnormality diagnosing unit, and the condition-signal generating unit, which are already described above. In each of the sub-systems, the base-signal generating unit and the condition-signal generating unit output the base signal and the condition signal, respectively, based on an abnormality-diagnosis start command outputted by the main control unit. The abnormality diagnosing unit outputs a result of the abnormality diagnosis to the main control unit via the bus line. Here, while a first sub-system within the plurality of sub-systems is executing the abnormality diagnosis, the main control unit outputs an abnormality-diagnosis start command to, within the plurality of sub-systems, a second sub-system that is different from the first sub-system to thereby cause the second sub-system to execute an abnormality diagnosis.

In a conventional system, after an abnormality diagnosis of a first sub-system is terminated, an abnormality diagnosis of a second sub-system is started. However, in the above structure, while a first sub-system is executing the abnormality diagnosis since an abnormality-diagnosis start command is outputted to the first sub-system, an abnormality-diagnosis start command is outputted to a second sub-system. Therefore, abnormality diagnoses for the multiple sub-systems connected with the main control unit via the bus line can be executed in parallel. Thus, a time period required for the abnormality diagnoses for the multiple sub-systems included in the vehicular occupant protection system can be significantly shortened.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
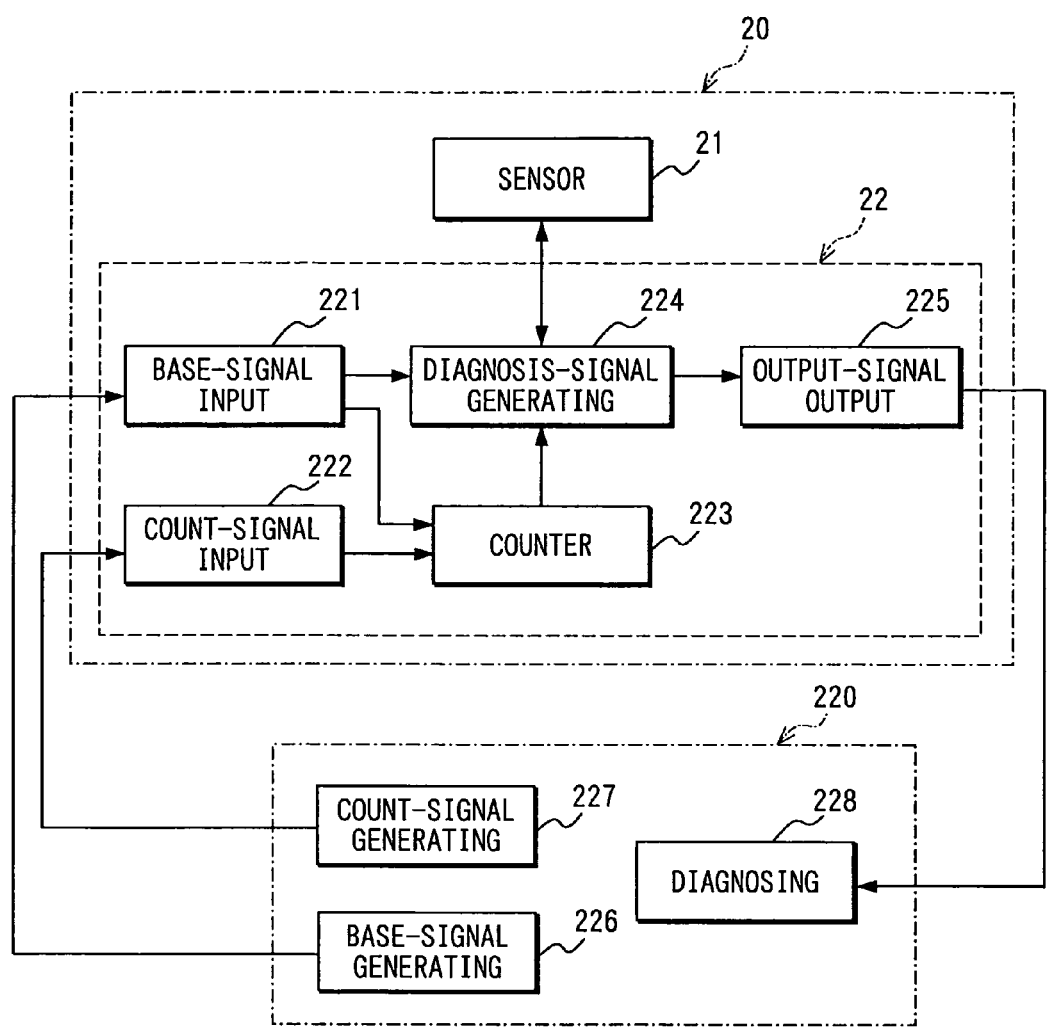
FIG. 1 is a block diagram showing an overall structure of a vehicular occupant protection system according to a first embodiment of the present invention.

As shown in FIG. 1, a vehicular occupant protection system according to a first embodiment of the present invention includes an air bag ECU 220 and an acceleration sensor unit 20. The air bag sensor ECU 220 executes an ignition control of an air bag module base on an output signal of an acceleration sensor 21 while performing an abnormality diagnosis (or failure diagnosis) for the acceleration sensor 21. The air bag ECU 220 is disposed in an approximately central portion in a vehicle. Here, in this embodiment, only an abnormality diagnosis for an acceleration sensor 21 will be explained, while an ignition control for an air bag module will be eliminated from explanation. Further, in this embodiment, only an initial diagnosis, i.e., a primary check will be explained from within an abnormality diagnosis for an acceleration sensor 21.

The air bag ECU 220 includes a base-signal generating unit 226, a count-signal generating unit 227 as a condition-signal generating unit, and an abnormality diagnosing unit 228. The base-signal generating unit 226 generates a base signal, i.e., a signal used for diagnosing the acceleration sensor 21. This base signal is a pulse signal that takes place from a start of a primary check to an end of the primary check, as shown in the second line from top in FIG. 2. Here, the primary check is started by an ignition switch turning on and is terminated after a given period elapses. This given period is, for instance, 100 msec to 200 msec. That is, a cycle of the base signal becomes 100 msec to 200 msec.

The count-signal generating unit 227 generates a count signal used for generating a count number N (condition signal). The count signal is a short cycle pulse signal that arises after a start of the primary check, as shown in the top line in FIG. 2. In detail, the count signal has a shorter cycle than the base signal. The cycle of the count signal is, for instance, 10 µsec.

The abnormality diagnosing unit 228 executes an abnormality diagnosis for the acceleration sensor 21 based on an output signal of the acceleration sensor 21. That is, the abnormality diagnosing unit 228 compares the output signal outputted from the acceleration sensor 21 to an output signal at a normal state to thereby diagnose whether the acceleration sensor 21 is in a normal state. When the acceleration sensor 21 is in an abnormal state, the acceleration sensor 21 is determined to be failed, which turns on a warning light.

The acceleration sensor unit 20 includes the acceleration sensor 21 and a sensor control unit 22. The sensor unit 20 is disposed, for instance, in proximity to a front or right or left side within a vehicle, being connected with the ECU 220. The acceleration sensor 21 can detect an acceleration arising. A sensor 21 that is disposed in proximity to the front of the vehicle can detect an acceleration that arises in proximity to the front when a collision occurs.

The sensor control unit 22 includes a base-signal input unit 221, a count-signal input unit 222, a counter 223, a diagnosis-signal generating unit 224, and an output-signal output unit 225. The base-signal input unit 221 is connected with the base-signal generating unit 226 in the air bag ECU 220 to receive the base signal inputted by the base-signal generating unit 226. Here, the base-signal input unit 221 and the count-signal input unit 222 are input terminals disposed in the sensor unit 20.

The counter 223 counts an occurrence (count) number N of the count signal inputted to the count-signal input unit 222. Note that the counter 223 counts only while the base signal is being inputted to the base-signal input unit 221. That is, when a base signal is re-inputted after the base signal is once terminated, the count number N of the count signal is re-counted from an initial state. While the base-signal generating unit 226 generates the base signal, the count number N increases. This count number N takes a role as a condition signal for a condition where the diagnosis-signal generating unit 224 starts generating of a diagnosis signal.

The diagnosis-signal generating unit 224 determines whether the count number N counted by the counter 223 reaches a previously stored base count number Nt. That is, it is determined whether the count number N satisfies the previously set condition. Here, the base count number Nt is set to four. While the base-signal generating unit 226 generates the base signal, the count number N of the count signal increases to thereby reach the base count number Nt, as shown in the top line in FIG. 2.

Figure 2:
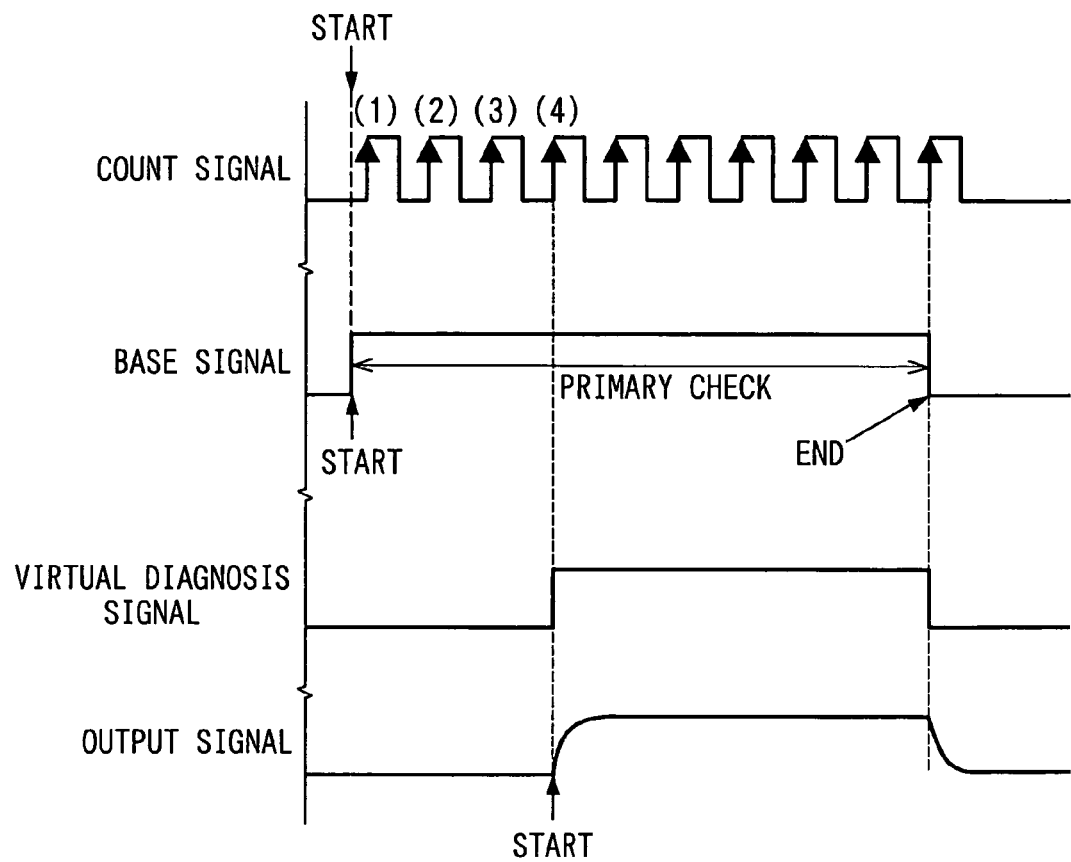
FIG. 2 is a time chart diagram of various signals according to the first embodiment.

The diagnosis-signal generating unit 224 inputs to the acceleration sensor 21 the base signal inputted to the base-signal input unit 221 from when the count number N is determined to be reaching the base count number Nt. That is, a virtual abnormality-diagnosis signal shown in the third line from top in FIG. 2 is inputted to the acceleration sensor 21 from when the count number N reaches the base count number Nt to when the primary check ends. As a result, the acceleration sensor 21 starts generating of an output signal from when the count number N reaches the base count number Nt and then ends generating of the output signal when the primary check ends.

Further, the diagnosis-signal generating unit 224 receives the output signal outputted from the acceleration sensor 21. As shown in the fourth line, the lowest line in FIG. 2, the output signal from the acceleration sensor 21 slowly increases after the start of generating the output signal, reaches a constant output value for a given period, and then decreases from when the primary check ends.

The output-signal output unit 225 is connected with the abnormality diagnosing unit 228 in the air bag ECU 220, to output the output signal generated by the acceleration sensor 21 to the abnormality diagnosing unit 228 in the air bag ECU 220. Here, the output-signal output unit 224 is an output terminal disposed in the sensor unit 20.

Next, a behavior occurring when the above vehicular occupant protection system experiences noises will be explained below. Namely, the behavior occurs when the base-signal generating unit 226 generates no base signal and the count-signal generating unit 227 generates no count signal. Hereinafter, two cases will be explained: a first case where short cycle noise has the same cycle as the count signal; and a second case where long cycle noise has the same cycle as the base signal.

In the first case, when the short cycle noise occurs that has the same cycle as the count signal, the short cycle noise disturbs or is inputted to the base-signal input unit 221 and the count-signal input unit 222. The counter 223 counts the count number N of the count signal being the short cycle noise since the counter 223 counts the count number N of the count signal while the base signal is inputted to the base-signal input unit 221. However, since the base signal being the short cycle noise immediately stops, the count number N is not increased. Therefore, the count number N does not reach the base count number Nt of four. The diagnosis-signal generating unit 224 does not output the base signal to the acceleration sensor 21, so that mis-operation of the acceleration sensor 21 does not arise.

Next, in the second case, when the long cycle noise occurs that has the same cycle as the base signal, the long cycle noise disturbs or is inputted to the base-signal input unit 221 and the count-signal input unit 222. The counter 223 counts the count number N of the count signal being the long cycle noise since the counter 223 counts the count number N of the count signal while the base signal is inputted to the base-signal input unit 221. Since the base signal arises, counting is continued; however, the count number N of the count signal being the long cycle noise is never increased. When the time period elapses, the base signal being the long cycle noise stops, so that the count number N is never increased. Therefore, the count number N of the count signal being the long cycle noise does not reach the base count number Nt of four. Consequently, the diagnosis-signal generating unit 224 does not output the base signal to the acceleration sensor 21, so that the mis-operation of the acceleration sensor 21 does not take place.

Thus, even when the noise of a short cycle or a long cycle interferes, the mis-operation of the acceleration sensor 21 in the abnormality diagnosis can be prevented.

In the above embodiment, as an air bag sensor, an acceleration sensor is used for an example; however, a load sensor or a pressure sensor for the air bag system can be substituted for the acceleration sensor.

Second Embodiment

Figure 3:
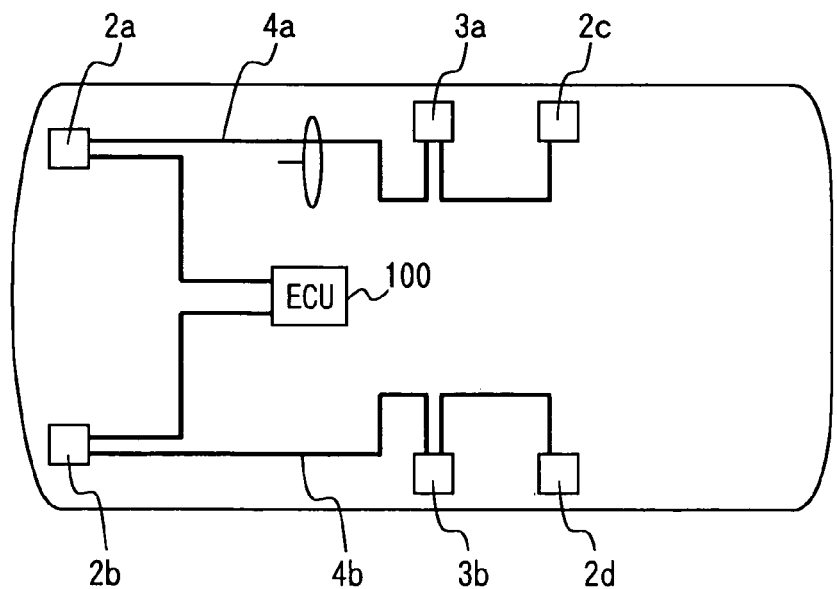
FIG. 3 is a view showing an overall structure of a vehicular occupant protection system according to a second embodiment of the present invention.
Figure 4:
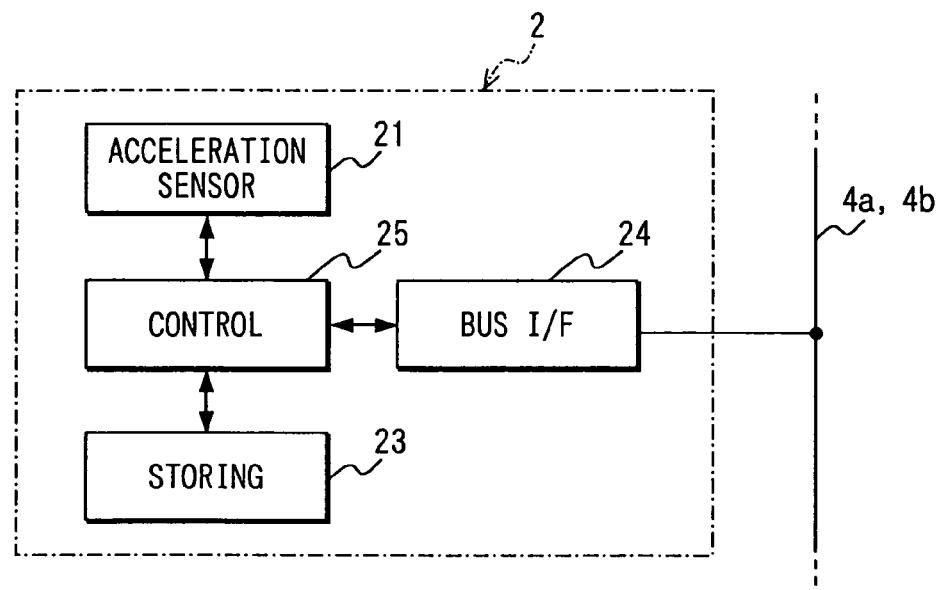
FIG. 4 is a block diagram showing an overall structure of an acceleration sensor sub-system in a vehicular occupant protection system according to the second embodiment.
Figure 5:
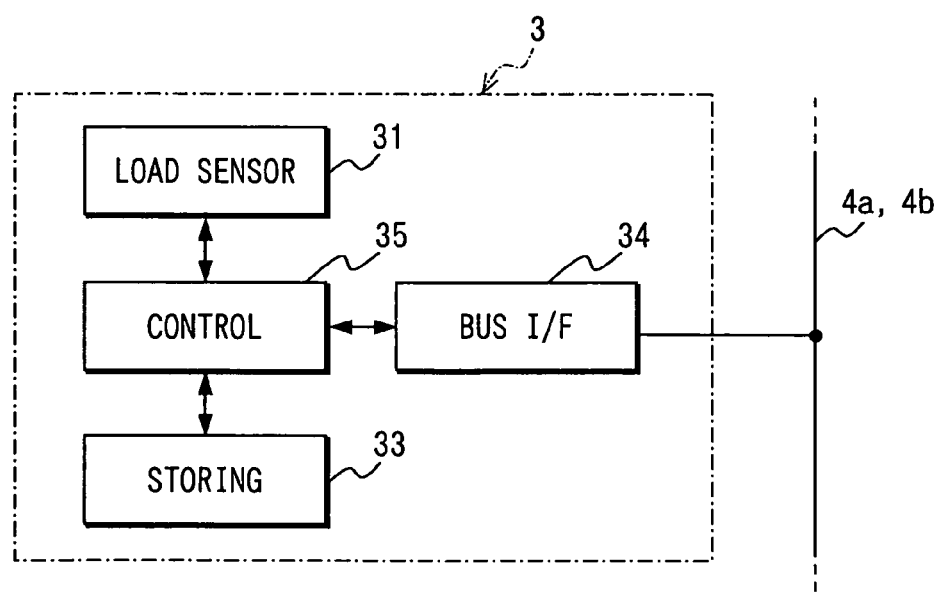
FIG. 5 is a block diagram showing an overall structure of a load sensor sub-system in a vehicular occupant protection system according to the second embodiment.

A structure of a vehicular occupant protection system according to a second embodiment will be explained with reference to FIGS. 3 to 5. As shown in FIG. 3, the vehicular occupant protection system includes an air bag ECU 100 as a main control unit; acceleration sensor sub-systems 2a to 2d; load sensor sub-systems 3a, 3b; and bus lines 4a, 4b.

The air bag ECU 100 executes abnormality determining, vehicle collision determining, or air bag ignition for the acceleration sensor sub-systems 2a to 2d and the load sensor sub-systems 3a, 3b. In the abnormality determining, abnormality-diagnosis start commands are outputted to the respective sub-systems 2a to 2d, 3a, 3b, while whether any sub-system is in an abnormal state is determined by using abnormality-diagnosis results and corresponding ID codes.

The abnormality-diagnosis start command is for causing each of the sub-systems 2a to 2d, 3a, 3b to start an abnormality diagnosis. The vehicle collision determining determines whether a collision occurs based on collision-detection signals and the corresponding IDs outputted from the sub-systems 2a to 2d, 3a, 3b, further determining how the vehicle collides when the collision is determined to be occurring. In the air bag ignition, the corresponding squib module is controlled in its ignition for expanding the corresponding air bag based on the result of determining how the vehicle collides when the vehicle is determined to be colliding. Further, in the air bag ignition, positions of the air bags that are to be expanded are determined based on the load signal outputted from the load sensor sub-systems 3a, 3b, while the expanding pressure is changed. The corresponding air bags are thereby expanded. The result of the abnormality diagnosis, the ID code, the collision detection signal, and the load signal will be explained later.

The acceleration sensor sub-systems 2a to 2d are disposed, in order, in proximity to the vehicle right front, in proximity to the vehicle left front, in proximity to the vehicle right side, and in proximity to the vehicle left side, respectively. Each of the acceleration sensor sub-systems 2a to 2d includes an acceleration sensor 21, an acceleration sensor sub-system control unit 25, an ID-code storing unit 23, and a bus interface 24. The acceleration sensor 21 detects an acceleration arising in itself to thereby output an acceleration signal.

The acceleration sensor sub-system control unit 25 executes vehicle-collision detecting, abnormality diagnosing, and ID-code recognizing. In the vehicle-collision detecting, the control unit 25 determines whether an acceleration signal inputted from the acceleration sensor 21 exceeds a given threshold value. When the acceleration signal is determined to be exceeding the given threshold value, the vehicle is determined to be colliding. A collision-detection signal is thereby outputted to the ECU 100. Simultaneously, in the vehicle-collision detecting, an ID code recognized in the ID-code recognizing is outputted to the ECU 100.

In the abnormality diagnosing for the acceleration sensor 21, it is diagnosed whether the acceleration sensor 21 is in a normal state or in an abnormal state. In detail, when the ECU 100 outputs an abnormality-diagnosis start command, an abnormality diagnosis is started. A vibration-addition signal is outputted to the acceleration sensor 21, so that the acceleration sensor 21 is caused to become in a vibration added state. The resultant acceleration signal from the acceleration sensor 21 is inputted for determining whether it exceeds the given threshold value. When it is determined that the resultant acceleration signal exceeds the given threshold value, the acceleration sensor 21 is determined to be normally operated. The acceleration sensor 21 is thereby determined to be in a normal state. By contrast, when it is determined that the resultant acceleration signal does not exceed the given threshold value, the acceleration sensor 21 is determined to be not normally operated. The acceleration sensor 21 is thereby determined to be in an abnormal state. An abnormality-diagnosis result of whether the acceleration sensor 21 is in a normal state or in an abnormal state is outputted to the ECU 100. Further, in the abnormality diagnosis for the acceleration sensor 21, an ID code recognized in the ID-code recognizing is also outputted to the ECU 100.

In the ID-code recognizing, an ID code stored in an ID-code storing unit 23 is recognized. The ID-code storing unit 23 stores ID codes assigned to the respective acceleration sensor sub-systems 2a to 2d. The bus interface 24 is connected with the bus line 4a, 4b, and outputs a collision-detection signal, abnormality-diagnosis result, and ID code that are outputted from the control unit 25 to the ECU 100 via the bus line 4a, 4b.

The load sensor sub-systems 3a, 3b are disposed, in order, in a lower portion of a driver-seat and in a lower portion of a assistant-driver-seat, respectively. Each of the load sensor sub-systems 3a, 3b includes an load sensor 31, a load sensor sub-system control unit 35, an ID-code storing unit 33, and a bus interface 34. The load sensor 31 detects a load applied on each of the seats to thereby output a load signal.

The load sensor sub-system control unit 35 executes load-signal outputting, abnormality diagnosing for the load sensor 31, and ID-code recognizing. In the load-signal outputting, a load signal inputted from the load sensor 31 is outputted to the control unit 35. Simultaneously, in the load-signal outputting, an ID code recognized in the ID-code recognizing is outputted to the ECU 100.

In the abnormality diagnosing for the load sensor 31, it is diagnosed whether the load sensor 31 is in a normal state or in an abnormal state. In detail, when the ECU 100 outputs an abnormality-diagnosis start command, the abnormality diagnosis is started. A load-applied signal is outputted to the load sensor 31, so that the load sensor 31 is caused to become in a load-applied state. The resultant load signal from the load sensor 31 is inputted for determining whether it exceeds the given threshold value. When it is determined that the resultant load signal exceeds the given threshold value, the load sensor 31 is determined to be normally operated. The load sensor 31 is thereby determined to be in a normal state. By contrast, when it is determined that the resultant load signal does not exceed the given threshold value, the load sensor 31 is determined to be not normally operated. The load sensor 31 is thereby determined to be in an abnormal state. The abnormality-diagnosis result of whether the load sensor 31 is in a normal state or in an abnormal state is outputted to the ECU 100. Further, in the abnormality diagnosis for the load sensor 31, the ID code recognized in the ID-code recognizing is also outputted to the ECU 100.

In the ID-code recognizing, an ID code stored in an ID-code storing unit 33 is recognized. The ID-code storing unit 33 stores ID codes assigned to the respective load sensor sub-systems 3a, 3b. The bus interface 34 is connected with the bus line 4a, 4b, and outputs a collision-detection signal, abnormality-diagnosis result, and ID code that are outputted from the control unit 35 to the ECU 100 via the bus line 4a, 4b.

The bus line 4a, 4b connects the ECU 100 and the respective sub-systems 2a to 2d, 3a, 3b. In detail, a first bus line 4a connects the ECU 100, an acceleration sensor sub-system 2a in proximity to the right front of the vehicle, an acceleration sensor sub-system 2c in proximity to the right side of the vehicle, and a load sensor sub-system 3a disposed in the driver-seat. A second bus line 4b connects the ECU 100, an acceleration sensor sub-system 2b in proximity to the left front of the vehicle, an acceleration sensor sub-system 2d in proximity to the left side of the vehicle, and a load sensor sub-system 3b disposed in the assistant-driver-seat.

Figure 6:
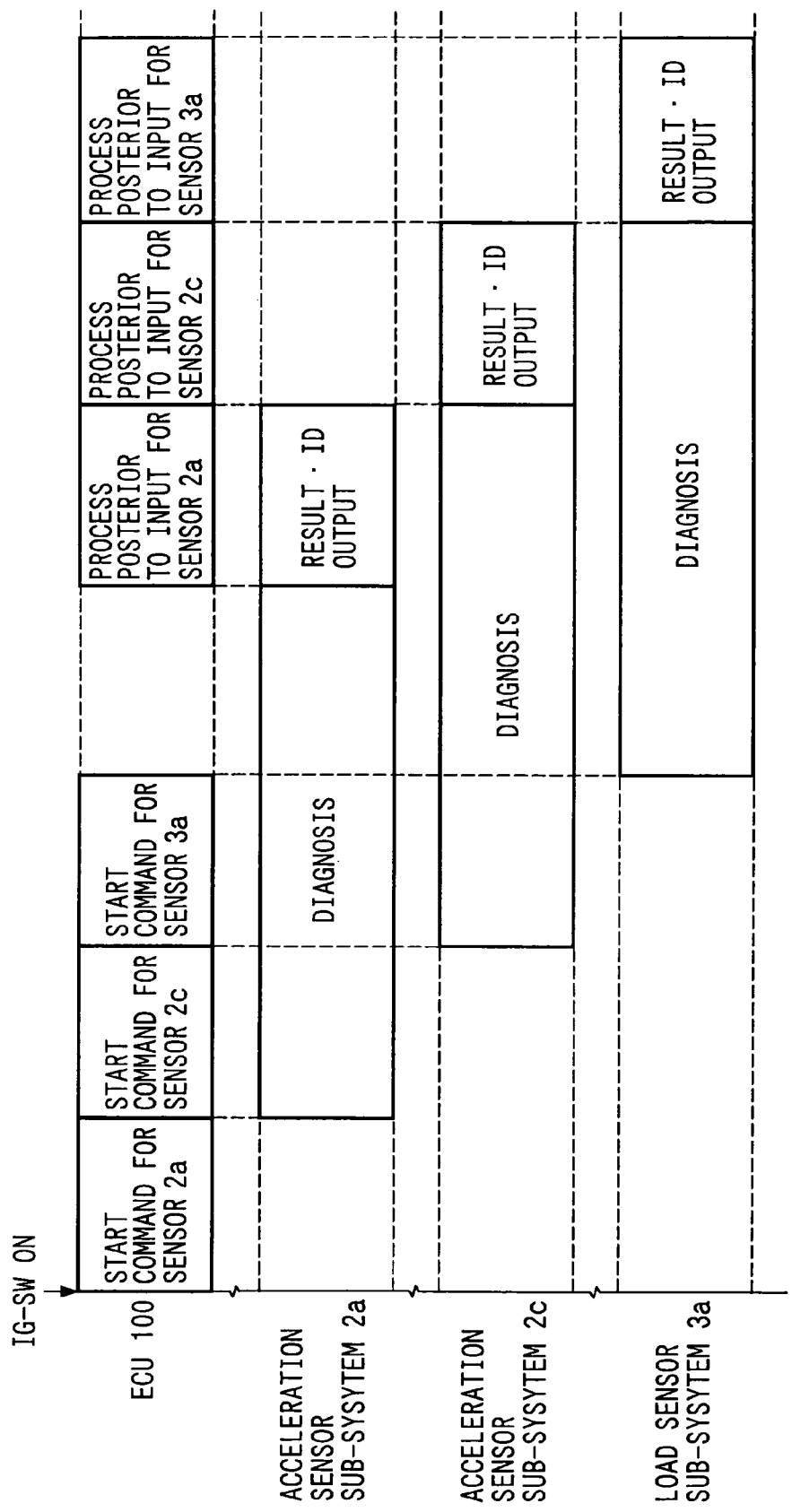
FIG. 6 is a time chart diagram showing abnormality diagnoses according to the second embodiment.

Next, abnormality determining in the above vehicular occupant protection system will be explained with reference to FIG. 6. FIG. 6 shows a time chart diagram of the abnormality determining for the ECU 100, the acceleration sensor sub-systems 2a, 2c, and the load sensor sub-system 3a that are connected by the first bus line 4a.

When an ignition switch is turned on, the ECU 100 outputs an abnormality-diagnosis start command for the sub-system 2a. The control unit 25 of the sub-system 2a starts an abnormality diagnosis for the acceleration sensor 21. When the abnormality diagnosis is ended, an abnormality-diagnosis result generated by the control unit 25 and an ID code of the sub-system 2a are outputted to the ECU 100. Here, the ECU 100 executes a process posterior to input of the abnormality-diagnosis result and the ID code, when they are outputted from the sub-system 2a. This process posterior to input is for storing the abnormality-diagnosis result and ID code with both associated with each other and causing an abnormality warning light to put on when the sub-system 2a is in an abnormal state.

Further, after the ECU 100 outputs the abnormality-diagnosis start command to the sub-system 2a, the ECU 100 outputs an abnormality-diagnosis start command to the sub-system 2c. That is, while the sub-system 2a executes the abnormality diagnosis, the ECU 100 outputs an abnormality-diagnosis start command to the sub-system 2c. The control unit 25 of the sub-system 2c starts an abnormality diagnosis for the acceleration sensor 21 of the sub-system 2c. When the abnormality diagnosis is ended, an abnormality-diagnosis result generated by the control unit 25 of the sub-system 2c and an ID code of the sub-system 2c are outputted to the ECU 100. Here, the ECU 100 executes a process posterior to input of the abnormality-diagnosis result and ID code, when they are outputted from the sub-system 2c.

Furthermore, after the ECU 100 outputs the abnormality-diagnosis start command to the sub-system 2c, the ECU 100 outputs an abnormality-diagnosis start command to the sub-system 3a. That is, while the sub-system 2c executes the abnormality diagnosis, the ECU 100 outputs an abnormality-diagnosis start command to the sub-system 3a. The control unit 25 of the sub-system 3a starts an abnormality diagnosis for the load sensor 31. When the abnormality diagnosis is ended, an abnormality-diagnosis result generated by the control unit 35 and an ID code of the sub-system 3a are outputted to the ECU 100. Here, the ECU 100 executes a process posterior to input of the abnormality-diagnosis result and ID code, when they are outputted from the sub-system 3a.

Here, the abnormality determining for the ECU 100, the acceleration sensor sub-systems 2b, 2d, and the load sensor sub-system 3b that are connected by the second bus line 4b is the same process as the above process relating to the first bus line 4a.

In the above embodiment, as an air bag sensor, an acceleration sensor and a load sensor are used for examples;

however, a pressure sensor or an angle sensor for the air bag system can be substituted for the acceleration sensor and the load sensor.

It will be obvious to those skilled in the art that various changes may be made in the above-described embodiments of the present invention. However, the scope of the present invention should be determined by the following claims.

What is claimed is:

1. A vehicular occupant protection system comprising:
   an air bag sensor;
   a base-signal generating unit configured to generate a base signal for abnormality diagnosis for the air bag sensor;
   a diagnosis-signal generating unit configured to generate a diagnosis signal for the air bag sensor based on the base signal;
   an abnormality diagnosing unit configured to execute the abnormality diagnosis by using an output signal that the air bag sensor outputs based on the diagnosis signal, the abnormality diagnosis being performed as an initial diagnosis started in response to turning on an ignition switch; and
   a condition-signal generating unit configured to generate a condition signal for a start of generating the diagnosis signal,
   wherein the diagnosis-signal generating unit generates the diagnosis signal based on the base signal when the condition signal satisfies a given condition.

2. The vehicular occupant protection system of claim 1, wherein the condition signal includes a cycle different from a cycle of the base signal.

3. The vehicular occupant protection system of claim 1, wherein the condition-signal generating unit includes:
   a count signal generating unit that generates a count signal that is counted; and
   a counter that counts a count number of the count signal and outputs the condition signal based on the counted number,
   wherein the diagnosis-signal generating unit generates the diagnosis signal based on the base signal when the condition signal of the count number reaches a given number.

4. The vehicular occupant protection system of claim 3, wherein the given count number is the count number of the count signal while the base signal is generated.

5. The vehicular occupant protection system of claim 1, further comprising:
   a main control unit; and
   a bus line that connects the main control unit and a plurality of sub-systems, wherein each of the sub-systems includes
      the air bag sensor,
      the base-signal generating unit,
      the diagnosis-signal generating unit,
      the abnormality diagnosing unit, and
      the condition-signal generating unit,
   wherein, in the each of the sub-systems, the base-signal generating unit and the condition-signal generating unit output the base signal and the condition signal, respectively, based on an abnormality-diagnosis start command outputted by the main control unit,
   wherein the abnormality diagnosing unit outputs a result of the abnormality diagnosis to the main control unit via the bus line,
   wherein, while a first sub-system within the plurality of sub-systems is executing the abnormality diagnosis, the main control unit outputs an abnormality-diagnosis start command to, within the plurality of sub-systems, a second sub-system that is different from the first sub-system to thereby cause the second sub-system to execute an abnormality diagnosis.

6. The vehicular occupant protection system of claim 5, wherein the main control unit outputs the abnormality-diagnosis start command while an initial diagnosis starting when an ignition switch is turned on.

7. The vehicular occupant protection system of claim 5, wherein the abnormality diagnosis includes an ID-code recognition that recognizes an ID code that is assigned to each of the sub-systems.

8. A vehicular occupant protection system comprising:
   an air bag sensor;
   a base-signal generating unit configured to generate a base signal for abnormality diagnosis for the air bag sensor;
   a diagnosis-signal generating unit configured to generate a diagnosis signal for the air bag sensor based on the base signal;
   an abnormality diagnosing unit configured to execute the abnormality diagnosis by using an output signal that the air bag sensor outputs based on the diagnosis signal; and
   a condition-signal generating unit configured to generate a condition signal for a start of generating the diagnosis signal, wherein the condition-signal generating unit includes:
      a count signal generating unit configured to generate a count signal that is counted; and
      a counter configured to count a count number of the count signal and output the condition signal based on the counted number,
   wherein the diagnosis-signal generating unit is configured to generate the diagnosis signal based on the base signal when the condition signal satisfies a given condition,
   wherein the diagnosis-signal generating unit is configured to generate the diagnosis signal based on the base signal when the condition signal of the count number reaches a given number.

9. The vehicular occupant protection system of claim 8, wherein the given count number is the count number of the count signal while the base signal is generated.

10. The vehicular occupant protection system of claim 9, wherein the given count number is the count number of the count signal while the base signal is generated.

11. The vehicular occupant protection system of claim 9, further comprising:
    a main control unit; and
    a bus line that connects the main control unit and a plurality of sub-systems, wherein each of the sub-systems includes
       the air bag sensor,
       the base-signal generating unit,
       the diagnosis-signal generating unit,
       the abnormality diagnosing unit, and
       the condition-signal generating unit,
    wherein, in each of the sub-systems, the base-signal generating unit and the condition-signal generating unit output the base signal and the condition signal, respectively, based on an abnormality-diagnosis start command outputted by the main control unit,
    wherein the abnormality diagnosing unit outputs a result of the abnormality diagnosis to the main control unit via the bus line, wherein, while a first sub-system within the plurality of sub-systems is executing the abnormality diagnosis, the main control unit outputs an abnormality-diagnosis start command to, within the plurality of sub-systems, a second sub-system that is different from the first sub-system to thereby cause the second sub-system to execute an abnormality diagnosis.

12. The vehicular occupant protection system of claim 11, wherein the main control unit outputs the abnormality-diagnosis start command while an initial diagnosis starting when an ignition switch is turned on.

13. The vehicular occupant protection system of claim 11, wherein the abnormality diagnosis includes an ID-code recognition configured to recognize an ID code that is assigned to each of the sub-systems.

14. The vehicular occupant protection system of claim 1, wherein the base signal is a pulse signal that takes place from a start of a primary check in response to the ignition switch turning on, to an end of the primary check.

* * * * *